United States Patent
Hong et al.

(10) Patent No.: US 8,543,241 B2
(45) Date of Patent: Sep. 24, 2013

(54) METHOD, MEDIUM, AND SYSTEM ESTIMATING POSE OF MOBILE ROBOTS

(75) Inventors: Bing rong Hong, Heilongjiang (CN); Rong hua Luo, Heilongjiang (CN); Mao hai Li, Heilongjiang (CN); Seok-won Bang, Yongin-si (KR); Yeon-ho Kim, Yongin-si (KR); Hyeon Myeong, Yongin-si (KR)

(73) Assignees: Samsung Electronics Co., Ltd., Suwon-Si (KR); Harbin Institute of Technology, Heilongjiang (CN)

( * ) Notice: Subject to any disclaimer, the term of this patent is extended or adjusted under 35 U.S.C. 154(b) by 1077 days.

(21) Appl. No.: 11/898,207

(22) Filed: Sep. 10, 2007

(65) Prior Publication Data

US 2008/0065267 A1     Mar. 13, 2008

(30) Foreign Application Priority Data

Sep. 13, 2006    (KR) ........................ 10-2006-0088726

(51) Int. Cl.
     *G06F 19/00*       (2011.01)
(52) U.S. Cl.
     USPC ............... 700/259; 701/23; 701/28; 700/245; 700/258; 318/568.12; 901/1
(58) Field of Classification Search
     USPC .................. 700/245, 246, 258, 259; 701/23, 701/28, 207, 217; 901/1; 318/568.11, 568.12
     See application file for complete search history.

(56) References Cited

U.S. PATENT DOCUMENTS

| | | |
|---|---|---|
| 7,015,831 B2 | 3/2006 | Karlsson et al. |
| 2006/0015215 A1 | 1/2006 | Howard et al. |

FOREIGN PATENT DOCUMENTS

KR    10-1998-059962     10/1998

OTHER PUBLICATIONS

N. M. Kwok and G. Dissanayake, "Bearing-only SLAM in Indoor Environments Using a Modified Particle Filter," In Proc. Australasian Conference on Robotics and Automation, 2003.*
D. Kurth, G. Kantor and S. Singh "Experimental Results in Range-Only Localization with Radio," In Proc. 2003 IEEE/RSJ Intl. Conference on Intelligent Robots and Systems, 2003, pp. 974-979.*
B. Yin, Z. Wei, and X. Zhuang, "Robust Mobile Robot Localization Using an Evolutionary Particle Filter," In Proc. International Conference of Computational Intelligence and Security, 2005, pp. 279-285.*
H. Durrant-Whyte and T. Bailey, "Simultaneous Localization and Mapping: Part I," IEEE Robotics and Automation Magazine, pp. 99-108, Jun. 2006.*
N. Karlsson, E. Bernardo, J. Ostrowski, L. Goncalves, P. Pirjanian, and M. Munich, "The vSLAM Algorithm for Robust Localization and Mapping," In. Proc. IEEE International Conference on Robotics and Automation, 2005, pp. 24-29.*

(Continued)

*Primary Examiner* — Thomas Black
*Assistant Examiner* — Peter D Nolan
(74) *Attorney, Agent, or Firm* — Staas & Halsey LLP

(57) ABSTRACT

A method, medium, and system reducing the computational complexity of a Simultaneous Localization And Mapping (SLAM) algorithm that can be applied to mobile robots. A system estimating the pose of a mobile robot with the aid of a particle filter using a plurality of particles includes a sensor which detects a variation in the pose of a mobile robot, a particle filter unit which determines the poses and weights of current particles by applying the detected pose variation to previous particles, and an evolution unit which updates the poses and weights of the current particles by applying an evolution algorithm to the poses and weights of the current particles.

40 Claims, 7 Drawing Sheets

(56) References Cited

OTHER PUBLICATIONS

N. Kwok, G. Fang, W. Zhou, "Evolutionary Particle Filter: Re-sampling from the Genetic Algorithm Perspective," In Proc. IEEE/RSJ International Conference on Intelligent Robots and Systems, 2005, pp. 2935-2940.*

S. Se, D. Lowe and J. Little, "Mobile Robot Localization and Mapping with Uncertainty using Scale-Invariant Visual Landmarks," The International Journal of Robotics Research, vol. 21, No. 8, Aug., pp. 735-758, 2002.*

"Particle Filter", Wikipedia, Nov. 9, 2010, XP002610528, Retrieved from the Internet: URL:http://en.wikipedia.org/wiki/Particle_filter [retrieved on Nov. 22, 2010].

"Evolutionary Algorithm", Wikipedia, Oct. 16, 2010, XP002610529, Retrieved from the Internet: URL:http://en.wikipedia.org/wiki/Evolutionary_alogrithm [retrieved on Nov. 22, 2010].

Extended European search report mailed Dec. 2, 2010 corresponds to European Patent Application No. 07116156.6.

* cited by examiner

METHOD, MEDIUM, AND SYSTEM ESTIMATING POSE OF MOBILE ROBOTS

CROSS-REFERENCE TO RELATED APPLICATIONS

This application claims priority from Korean Patent Application No. 10-2006-0088726 filed on Sep. 13, 2006 in the Korean Intellectual Property Office, the disclosure of which is incorporated herein by reference in its entirety.

BACKGROUND

1. Field of the Invention

One or more embodiments of the present invention relate to a mobile robot, and more particularly, to a method, medium, and system reducing the computational complexity of a Simultaneous Localization And Mapping (SLAM) algorithm applied to mobile robots.

2. Description of the Related Art

Robots or robotic devices were originally developed for industrial purposes and have been widely used for factory automation and for performing various functions in hazardous or extreme environments. Nowadays, robotics has evolved from the field of state-of-the-art space robots to the field of human-friendly home robots. In addition, robots have been proposed for replacing conventional medical equipment by being injected into the human body and repairing tissue that might not have been otherwise repaired. Thus, with recent achievements in the robotics field, robotics has moved into the limelight of the world in anticipation that robotics, as one of the most advanced fields of science, will increasingly replace other fields of science, such as Internet-based information technology and biotechnology.

In recent years, home mobile robots such as cleaning robots have been widely commercialized, so mobile robots are becoming more and more commonplace in people's daily lives.

In this regard, in robotics, localization techniques refer to processes by which a robot determines its position with respect to its surroundings. For example, in a "pure" localization system, the robot is provided with a map of its surroundings. Such "pure" localization systems are disadvantageous because generating a map via manual techniques is a relatively difficult, labor-intensive, and specialized task. Moreover, many environments are not static. For example, the rearranging of furniture in a room can render a preexisting map unusable. As a result, maps in pure localization systems are subject to relatively frequent and costly updates so that the map accurately represents its surroundings.

Therefore, it is desirable to develop localization techniques that are capable of planning the path of movement of a mobile robot and dynamically creating a map by determining the absolute position of the mobile robot based on a variation in the relative position of the mobile robot with respect to the surroundings of the mobile robot and one or more feature points of the surroundings of the mobile robot, even when no spatial information regarding the surroundings of the mobile robot is provided.

In the meantime, one of the most widely used techniques for determining the absolute position of a mobile robot based on the surroundings of the mobile robot and the relative position of the mobile robot with respect to the surroundings of the mobile robot is Simultaneous Localization And Mapping (SLAM). According to SLAM, even when a mobile robot does not have any spatial information (i.e., map information) regarding its surroundings, it still can extract one or more feature points with reference to distance data obtained using ultrasound waves, laser beams, or image data obtained using a camera, for example, and configure map information based on the extracted feature point. Then, the mobile robot can determine its position based on the configured map information.

Kalman filters are generally used to determine the pose of a mobile robot based on one or more feature points. However, pose estimation methods that involve the use of Kalman filters can be effective only when the distribution of estimated pose errors follow a Gaussian distribution. As part of the effort to address this problem, it has been suggested to use a pose estimation technique that extracts a number of samples regarding position estimates and determines an optimum pose of an object using the probability of each of the extracted samples even when the distribution of estimated pose errors does not follow a Gaussian distribution, i.e., a particle filter technique.

An example of such a particle filter technique is set forth in U.S. Pat. No. 7,015,831, which discusses incrementally updating the pose of a mobile device using visual SLAM techniques, and particularly, to a SLAM technique using a particle filter. To implement this technique, U.S. Pat. No. 7,015,831 sets forth using a plurality of sensors (i.e., odometer and a camera) using two particle sets.

However, such a SLAM technique using a particle filter generally requires a considerable number of samples, thereby increasing the amount of computation and making it difficult for a mobile robot to determine the pose of the mobile robot when the mobile robot moves from one place to another. Therefore, a particle filter-based SLAM technique capable of reducing the amount of computation and thus enabling real-time determination of the pose of a mobile robot is desired.

SUMMARY

One or more embodiments of the present invention provide a method, medium, and system performing real-time localization and mapping operations by reducing computational complexity for mobile robots that use a particle filter-based Simultaneous Localization And Mapping (SLAM) technique.

Additional aspects and/or advantages of the invention will be set forth in part in the description which follows and, in part, will be apparent from the description, or may be learned by practice of the invention.

To achieve the above and/or other aspects and advantages, embodiments of the present invention include a movement system, the system including a particle filter unit to determine poses and weights of current particles by applying a detected pose variation to previously identified particles, with the detected pose variation being detected by a sensor to detect a pose variation in a pose of a mobile element, and an evolution unit to update the determined poses and weights of the current particles by applying an evolution algorithm to the determined poses and weights of the current particles to estimate a current pose of the mobile element.

To achieve the above and/or other aspects and advantages, embodiments of the present invention include a mobile movement controlling method, the method including determining poses and weights of current particles by applying a detected pose variation to previously identified particles, with the detected pose variation being a pose variation in a pose of a mobile element, and updating and outputting the determined poses and weights of the current particles by applying an evolution algorithm to the determined poses and weights of the current particles to estimate a current pose of the mobile robot.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
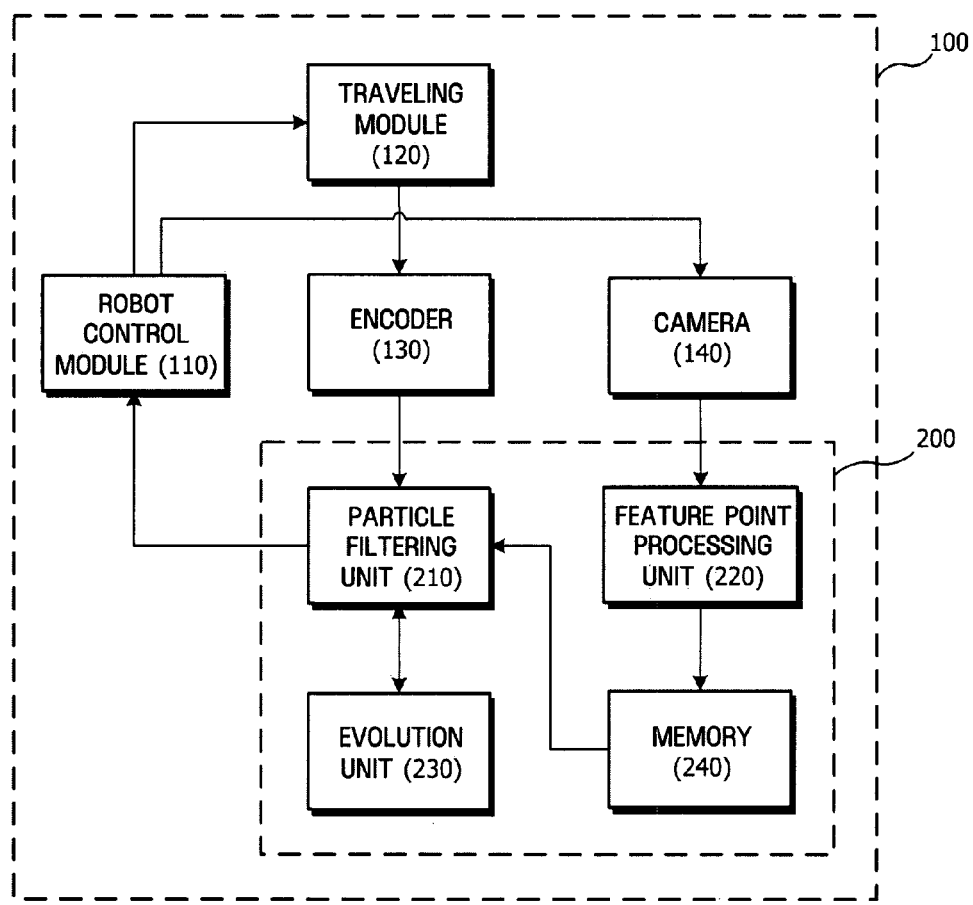
FIG. 1 illustrates a mobile robot system, according to an embodiment of the present invention.

Reference will now be made in detail to embodiments, examples of which are illustrated in the accompanying drawings, wherein like reference numerals refer to the like elements throughout. In this regard, embodiments of the present invention may, be embodied in many different forms and should not be construed as being limited to embodiments set forth herein. Accordingly, below, embodiments are described below to explain the present invention by referring to the figures.

In order to address problems with conventional Kalman filter-based Simultaneous Localization And Mapping (SLAM) techniques, including the aforementioned problem of failing to properly handle non-Gaussian distributions and a problem caused by multiple hypotheses, one or more embodiments of the present invention adopt a particle filter-based SLAM algorithm. Here, such a problem caused by multiple hypotheses is a problem in that, once a wrongful assumption is adopted when more than one feature point matching assumption is available, the consequences of the wrongful assumption cannot be addressed.

According to one or more embodiments of the present invention, an optimum pose of a mobile robot may be estimated by matching an estimated feature point location, obtained by a particle filter using a small number of particles, to an observed feature point location. For optimal estimation of the pose of a mobile robot, evolutionary algorithms such as genetic algorithms may be used. Once the optimum feature point location is determined, a most recent optimum feature point location can be determined based on the optimum feature point location through feature point matching.

One or more embodiments of the present invention aim to provide a method, medium, and system capable of reducing computational complexity, with the use of fewer particles, and achieving better performance in terms of pose errors, than in a conventional particle filter-based SLAM techniques. According to one or more embodiments of the present invention, a genetic algorithm may be used in addition to a particle filter, thereby only slightly increasing computational complexity. Here, the degree to which the computational complexity is reduced by reducing the number of particles used outweighs the degree to which the computational complexity is increased by adopting a genetic algorithm. Thus, according to one or more embodiments of the present invention, it is possible to reduce computational complexity compared to the conventional techniques.

FIG. 1 illustrates a mobile robot system 100, according to an embodiment of the present invention. Referring to FIG. 1, the mobile robot 100 may include a robot control module 110, a travelling module 120, an encoder 130, a camera 140, and a pose estimation module 200, for example.

In an embodiment, the travelling module 120 may supply the mobile robot 100 with power so that the mobile robot 100 can move. Still further, the travelling module 120 may include a plurality of travelling wheels and/or an orientation control unit, for example, noting that alternative mechanisms for travelling are equally available.

Here, in this example, the encoder 130 may sense the rotation speed of such travelling wheels of the travelling module 120, for example, thereby determining variations in the location and orientation of the mobile robot 100. The encoder 130 may be provided in order to control the movement of the mobile robot 100 when the mobile robot 100 moves in response to a command to change the location or orientation of the mobile robot 100, for example, and by using the encoder 130, it may be possible to determine a current location of the mobile robot 100 by integrating the distance and the direction traveled by the mobile robot 100. If no such integration error exists, then precise localization of the mobile robot 100 may be possible simply using the encoder 130. However, while the encoder 130 may be accurate, over a relatively short period of time, the encoder 130 may accumulate errors over time as sampling is further performed. In another embodiment, an inertial sensor such as a gyroscope may be used, instead of the encoder 130, to sense the movement of the mobile robot 100, again noting that alternatives are equally available.

The camera 140 may capture a digital image of the outside of the mobile robot 100, for example. Here, the camera 140 may include a charge coupled device (CCD) module or a complementary metal oxide semiconductor (CMOS) module, also as an example.

The robot control module 110 may control the travelling module 120 and the camera 140 of the mobile robot 100. In other words, in such an embodiment, the robot control module 110 may control the mobile robot 100 to move to a location desired by a user in response to an example user command, or controls an image capturing operation of the camera 140, etc.

The pose estimation module 200 may, thus, estimate a pose of the mobile robot by applying an evolutionary algorithm to a particle filter. In addition to such pose estimation operations, the pose estimation module 200 may also perform a mapping operation, depending on embodiment.

Here, the pose estimation module 200 may include a particle filter unit 210, a feature point processing unit 220, an evolution unit 230, and a memory 240, for example.

The feature point processing unit 220 may extract a feature point by processing the example image captured by the camera 140. Then, the feature point processing unit 220 may update a plurality of previously stored feature points based on the extracted feature point. In other words, in this example, the feature point processing unit 220 may change the previously stored feature points based on the extracted feature point or may add the extracted feature point to the previously stored feature points.

The particle filter unit 210 applies a particle filter. In detail, the particle filter unit 210 may select a plurality of particles, vary the weights of the selected particles according to a phase of movement of the mobile robot 100, and perform resampling on the selected particles according to the varied weights.

The evolution unit 230 may further apply an evolution algorithm to each of the selected particles, for example, thereby obtaining a plurality of evolved particles and a plurality of evolved weights respectively corresponding to the evolved particles.

The memory 240 may further be used to store a plurality of feature points. The memory 240 may also be used to create a map based on the feature points stored therein.

Figure 2:
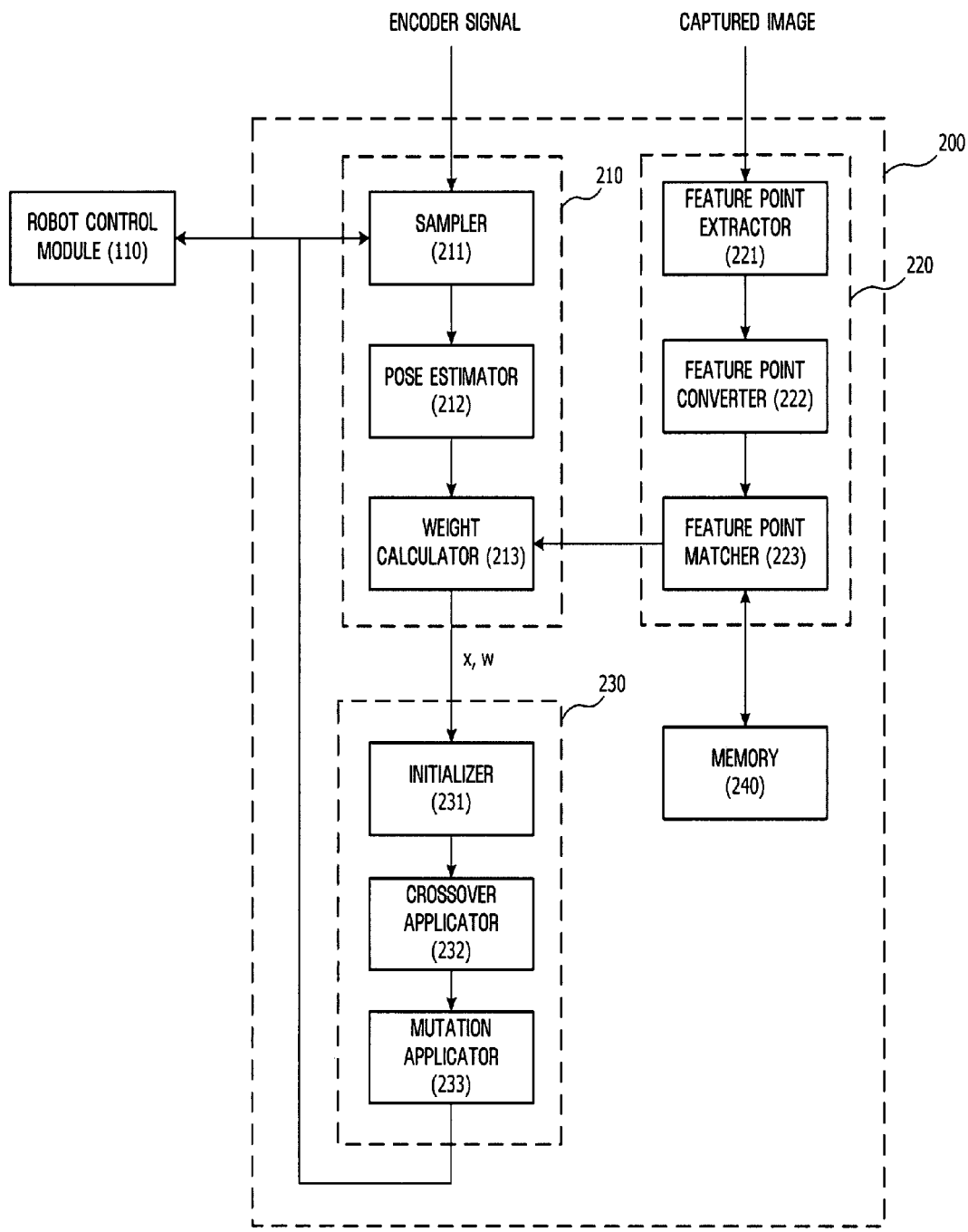
FIG. 2 illustrates a pose estimation unit, such as that illustrated in FIG. 1, according to an embodiment of the present invention.

Accordingly, FIG. 2 illustrates a block diagram of a pose estimation module 200, such as that illustrated in FIG. 1, according to an embodiment of the present invention. Referring to FIG. 2, the feature point processing unit 220 may include a feature point extractor 221, a feature point converter 222, and a feature point matcher 223, for example.

Here, the feature point extractor 221 may extract one or more feature points that are scale-invariant and rotation-invariant from an image that is captured by the camera 140, for example. Feature points can be used to create a map during SLAM, and can also be referred to as landmarks. As a mobile robot moves, feature points should become larger or smaller or may rotate about other feature points. Thus, in order to properly extract feature points regardless of the aforementioned feature point variations, feature points that are scale-invariant and rotation-invariant should be sorted out and then used as landmarks. According to an embodiment of the present invention, the extraction of feature points may involve the below exemplary operations (a) through (e), noting that alternatives are also available.

Operation (a) Obtaining Original Image

An original image, e.g., an image obtained by digitalizing an image captured by a CCD camera through sampling, may be obtained.

Operation (b) Obtaining Gaussian-Blurred Images

Further, N Gaussian-blurred images may be obtained by performing Gaussian blurring on the original image N times. Thus, a number of images having different scales can be obtained by a number of iterations of Gaussian blurring. The more the original image is Gaussian-blurred, the longer the observation distance becomes or is represented. Such a representation is based on the characteristic of human visual perceptions, that long observation distances result in a blurry image.

Operation (c) Calculating Difference Between Gaussian-Blurred Images

A difference of Gaussian (DoG) may be calculated based on the difference between a pair of adjacent Gaussian-blurred images. In an embodiment, a distance D1 between two Gaussian-blurred images I1 and I2 may be determined by the below Equation 1, for example.

$$D_1(x,y) = I_2(x,y) - I_1(x,y) \quad \text{Equation 1}$$

Here, x and y respectively indicate x and y coordinates of an image.

In this example, a total of (N−1) DoG images can be obtained from N Gaussian-blurred images.

Operation (d) Detecting Extremas from DoG Image

Extremas may further be detected from the DoG image. Extremas are pixels having a higher or lower greyscale value than the surrounding pixels, and are pixels that clearly change after being Gaussian-blurred. Extremas are highly stable against scale variation or rotation variation.

Operation (e) Selecting Feature Points in Order to Obtain Feature Points

The above extrema in a DoG image can be referred to as a candidate key point. Thus, in order to improve the stability of feature points, points that are mistakenly chosen from along edges as feature points are removed. In this regard, in an embodiment, operation (e) becomes a necessary operation.

The feature point converter 222 may determine the exact locations and orientations of feature points that are extracted from an estimated current location of the mobile robot 100 and the gradient of the grayscale of the feature points, for example. For this, the feature point converter 222 may sample a local image in the vicinity of a key point, calculate the locations and orientations of all feature points, and calculate a plurality of gray gradient vectors that respectively describe the feature points from a gray gradient viewpoint.

In detail, for example, the feature point converter 222 may perform the below operations (f) and (g).

Operation (f) Calculating Locations and Orientations of Feature Points

The feature point converter 222 may, thus, represent a current location of a key point using pixel coordinates. In order to improve precision or accuracy, pixel coordinates may be interpolated. The feature point converter 222 may further allocate a fixed orientation to each key point according to the gray gradient of a 64×64 pixel image, for example, including a corresponding key point, thereby obtaining the effect of rotation-invariance.

Operation (g) Calculating Gray Gradient Vectors of Feature Points

Figure 3:
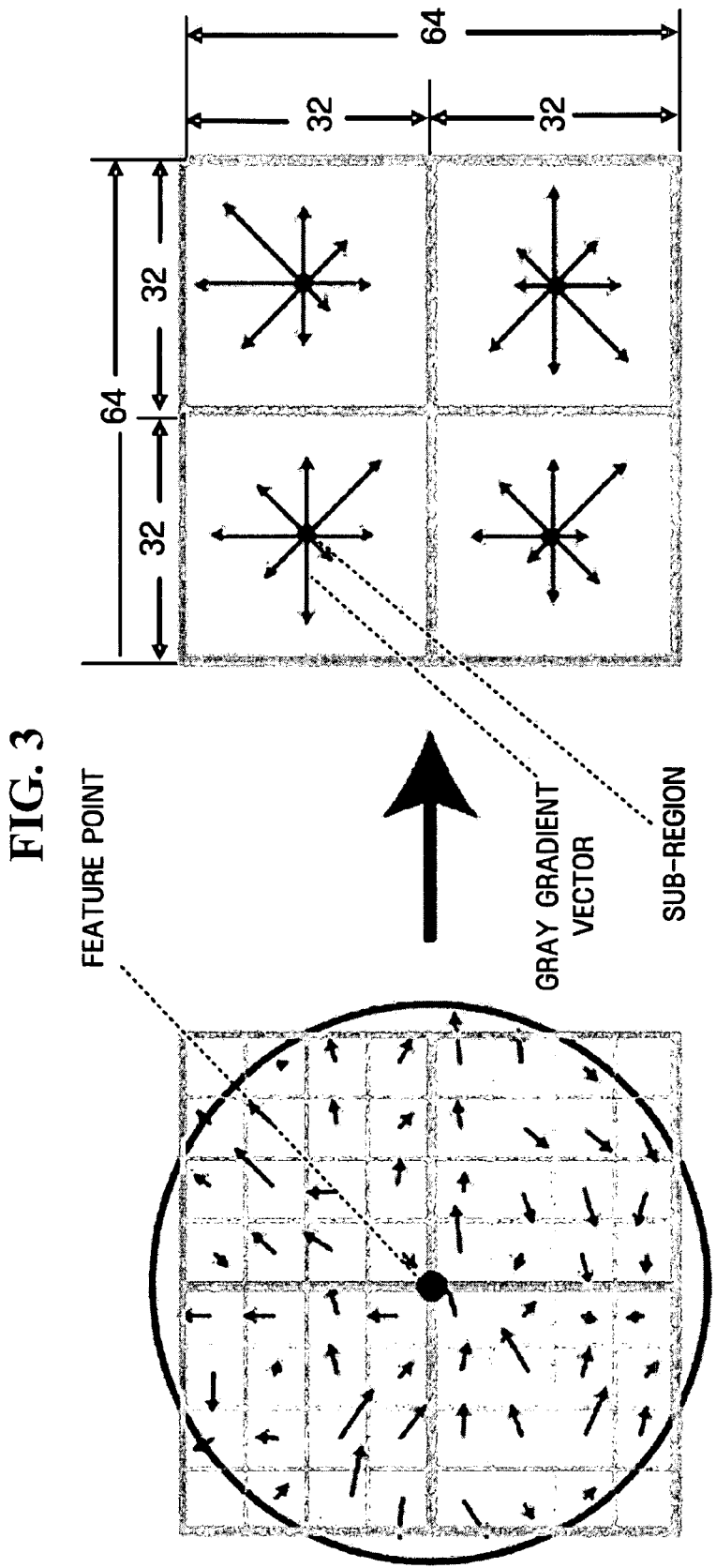
FIG. 3 illustrates a calculation of gray gradient vectors of feature points, according to an embodiment of the present invention.

Referring to FIG. 3, the feature point converter 222, for example, may thus allocate four sub-regions for each feature point. Each of the example four sub-regions can correspond to eight gray gradient vectors. Accordingly, a total of 32 example gray gradient vectors may be provided for each feature point. Referring to FIG. 3, the magnitude of a gray gradient vector is represented by the length of an arrow. In other words, a long arrow indicates a large gray gradient.

The feature point matcher 223, for example, may further compare the gray gradient vector of a current feature point with the gray gradient vectors of stored feature points, such as those stored in the memory 240, and may search the stored feature points for a match for the current feature point. When the difference between the gray gradient vectors of a pair of feature points meets or is less than a predefined threshold, it may be determined that the feature points match. If more than one feature point stored in the memory 240 matches the current feature point, a feature point that is most similar to the current feature point may be chosen as a match for the current feature point, for example. If none of the feature points stored in the memory 240 match the current feature point, then the current feature point may be stored in the memory 240, for example, as a new feature point.

Referring to FIG. 2 again, the particle filter unit 210 may include a sampler 211, a pose estimator 212, and a weight calculator 213, for example. The particle filter unit 210 may calculate the location and orientation of the example mobile robot 100, which can be estimated based on the properties of the feature points provided by the feature point processing unit 220, e.g., the weights of a plurality of pose sample values, and estimate an optimum pose of the example mobile robot 100 based on the weights of the pose sample values. Here, the weights of the pose sample values indicates the probabilities of the pose sample values being true. Herein, though embodiments of the present invention have been set forth with an emphasis on the pose of a mobile robot, embodiments of the present invention are not limited thereto.

Thus, in detail, the pose estimator 212 may represent, as a probability distribution, the pose of the mobile robot 100 when the mobile robot 100 moves, for example. The probability distribution may be defined by a conditional probability $p(x_t|x_{t-1}, u_{t-1})$ where $x_{t-1}$ indicates a pose at a time (t−1), $u_{t-1}$ indicates data measured by an encoder, and $x_t$ indicates a pose at a time t (current time). The pose of the mobile robot 100 may be based on three components including a pair of coordinates of the mobile robot 100 on a two-dimensional (2D) orthogonal coordinate system and the azimuth of the mobile robot 100, for example. Thus, in an embodiment, the probability distribution is a probability distribution regarding the pose of the mobile robot 100 at a time t when the mobile robot 100 moves from $x_{t-1}$ to $x_t$ with dynamic noise or other uncertain factors present in a system.

Figure 4:
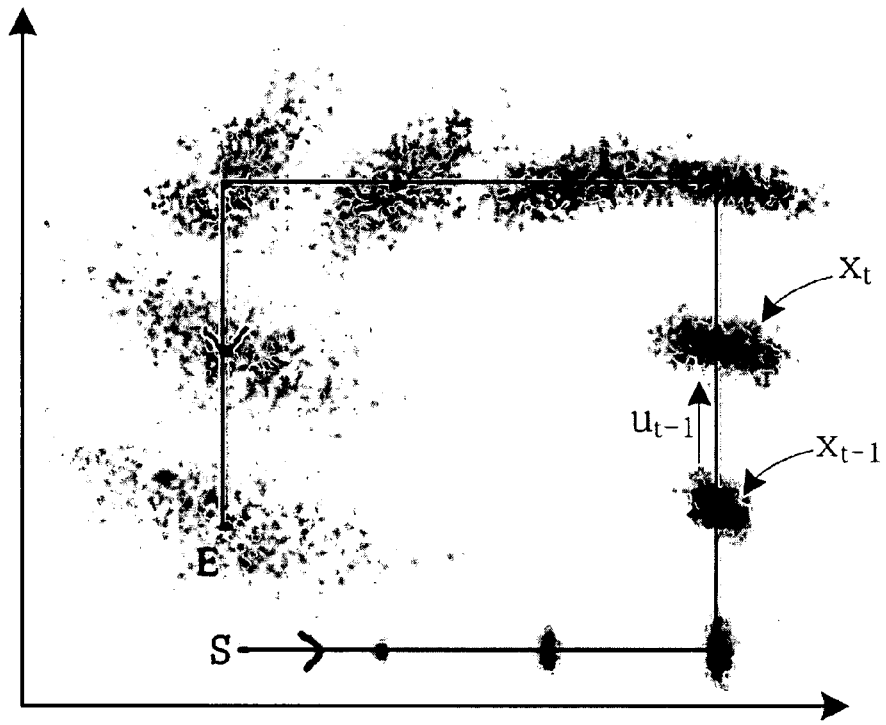
FIG. 4 illustrates a probability distribution regarding a pose of a mobile robot, such as mobile robot 100 of FIG. 1, that moves from a start point S to an end point E.

In this regard, FIG. 4 illustrates a probability distribution regarding a pose of the mobile robot 100 that moves from a start point S to an end point E. Referring to FIG. 4, the more distant the mobile robot 100 is from the start point S, the more the particles are illustrated as being dispersed. This is because error of an example encoder increases according to the distance from the start point S.

Accordingly, assuming that the number of particles in a particle filter is N, an i-th particle (where i is an integer between 1 and N) can be represented by $(x_t(i), w_t(i))$ where $x_t(i)$ indicates a feasible pose of an i-th particle at a time t and $w_t(i)$ is a weight of the i-th particle and indicates the probability of an actual pose of the mobile robot 100 coinciding with the feasible pose $x_t(i)$. The pose estimator 212 may, thus, calculate the feasible pose $x_t(i)$ according to a probability model $p(x_t|x_{t-1}, u_{t-1})$.

The sampler 211 performs random sampling, thereby obtaining a set of N initial particles. Then, when a time count t increases by 1, a number of initial particles with low weight values are excluded, and a number of initial particles with high weight values are repeatedly sampled, thereby obtaining another set of N particles. This operation is referred to as resampling. In other words, the sampler 211 performs an initial sampling operation and then a number of resampling operations.

The initial random sampling operation is an operation of selecting N arbitrary points, i.e., N particles, near an initial location of the mobile robot 100. The initial random sampling operation may be represented by the below Equation 2, for example.

$$S_0 = \{(x_0^{(j)}, w_0^{(j)}) | j=1, \ldots, N\} \quad \text{Equation 2}$$

Here, $x_0(j)$ and $w_0(j)$ indicate an initial pose and an initial weight, respectively, of a j-th particle. The initial weight $w_0(j)$ may be set to 1/N.

When the time count t increases, the sampler 211 may, thus, obtains N random samples from an existing set $S_{t-1}$ of particles through resampling, and obtain a new set of samples based on a weight $w_{t-1}(j)$.

Whenever the time count increases, the weight calculator 213 may further calculate a new weight of each particle and update the current weight $w_t(j)$ with the new weight.

Referring to $(x_t(j), w_t(j))$, which is particle obtained at the time t regarding the j-th particle, $w_t(j)$ indicates the probability of an actual pose of the mobile robot 100 at the time t coinciding with $x_t(j)$.

When the example mobile robot 100 obtains new information, the weight calculator 213 may calculate a new weight for each particle based on the new information. Here, the calculation of a weight for each particle indicates the localization of the mobile robot 100 by modifying a probability regarding the mobile robot 100. Since the encoder 130 typically accumulates errors over time, it is desirable to calculate a new weight for each particle after a feature point matching operation performed by the feature point matcher 223.

The new weight $w_t(j)$ may be calculated using the below Equation 3, for example.

$$w_t^{(j)} = \frac{p(y_t | x_t^{(j)}) p(x_t^{(j)} | \bar{x}_{t-1}^{(j)}, u_{t-1}) p(\bar{x}_{t-1}^{(j)} | Y^{t-1})}{p(x_t^{(j)} | \bar{x}_{t-1}^{(j)}, u_{t-1}) p(\bar{x}_{t-1}^{(j)} | Y^{t-1})} = p(y_t | x_t^{(j)}) \quad \text{Equation 3}$$

Here, $y_t$ indicates an observed pose of the mobile robot 100 at the time t. According to the above Equation 3, the weight $w_t(j)$ can be interpreted as being the probability of the pose $x_t(j)$ coinciding with an actually observed pose, i.e., $y_t$. The observed pose $y_t$ can be determined based on a plurality of feature points that are matched by the feature point matcher 223.

Figure 5:
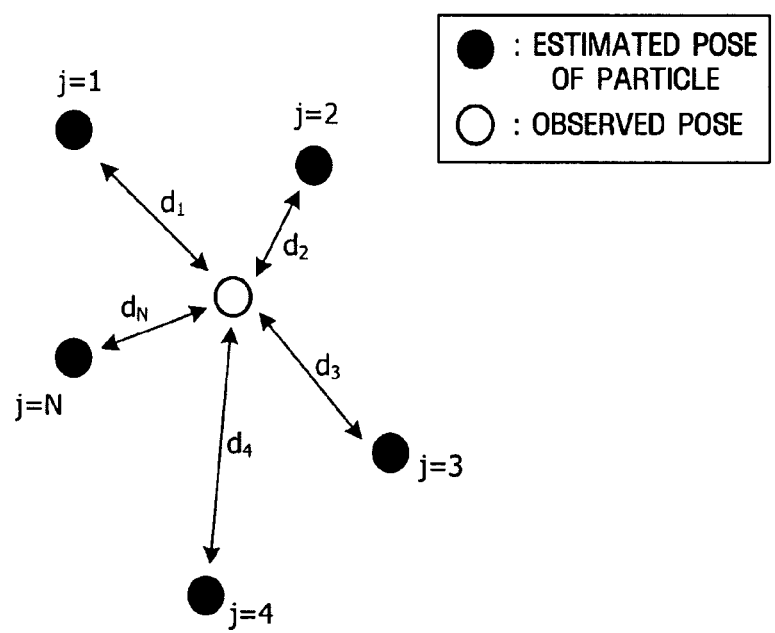
FIG. 5 illustrates differences between an observed pose and a plurality of estimated particle poses.

For example, referring to FIG. 5, and assuming that a total of N estimated particle poses are provided, the weight $w_t(j)$ can be calculated as being proportional to the inverse numbers of distances d1, d2, ..., and dN between the N estimated particle poses and an observed pose. In other words, the less distant the estimated particle pose is from the observed pose, the higher the weight $w_t(j)$ becomes.

Referring to FIG. 2, the evolution unit 230 may include an initializer 231, a crossover applicator 232, and a mutation applicator 233, for example. The evolution unit 230 may optimize a plurality of state parameters using an evolution algorithm. In an embodiment, the state parameters include $x_t(j)$ and $w_t(j)$ where $x_t(j)$ indicate the pose of the j-th particle at the time t and may be estimated by the pose estimator 212, for example, and wt %) indicates the weight of the j-th particle and is calculated and updated by the weight calculator 213, also as an example.

As a result of the aforementioned pose estimation and weight calculation, N feasible poses and respective corresponding probabilities can be obtained. However, none of the N feasible poses may match the actual pose of the mobile robot 100. In order to precisely determine the pose of the mobile robot 100, a considerable number of particles of a particle filter are typically needed. However, as the number of particles used increases, the computational requirements and memory resources considerably increase. Therefore, the evolution unit 230 may optimize a number of feasible poses so that the feasible poses can more approximate the actual pose of the mobile robot 100. As a result of the optimization, the number of particles that are needed to localize the mobile robot 100 can be further reduced.

Examples of the evolution algorithm used by the evolution unit 230 include a crossover algorithm and/or a mutation algorithm, for example. One or more embodiments of the present invention will hereinafter be described in view of such crossover and/or mutation algorithms, which are expected to provide good performance, as examples of the evolution algorithm, e.g., as used by the evolution unit 230.

The initializer 231 may determine an evolution level G and an evolution sample quantity M that may be applied to an evolution algorithm. The evolution level G and the evolution sample quantity M may be set according to user input or may be respectively set to default values that are predetermined, e.g., by the pose estimation module 200. The higher the evolution level G, the higher the precision may become. However, the higher the evolution level G, the greater the number of computations. Therefore, the evolution level G is desirably set to an appropriate value. In an embodiment, the evolution level G may be set to a value of 3 to 5. The evolution level G may also vary or be based on the computing capability of the example pose estimation module 200.

Likewise, the greater the evolution sample quantity M, the higher the precision may become. However, the greater the evolution sample quantity M, the greater the number of computations. Therefore, in an embodiment, the evolution sample quantity M may desirably be set to an appropriate value, such as a value of 10, for example. The evolution sample quantity M may thus vary from one particle to another or may be the same for all or groups of particles.

The crossover applicator 232 may extract a pair of samples xt(A) and xt(B) that may be randomly selected from among M evolution samples that are chosen for a predetermined particle, and apply a crossover algorithm to the extracted samples xt(A) and xt(B), for example Such a crossover algorithm may be represented by the below Equation 4, for example.

$$\begin{cases} x_t^{(Ac)} = \xi x_t^{(A)} + (1-\xi)x_t^{(B)}, \\ x_t^{(Bc)} = \xi x_t^{(B)} + (1-\xi)x_t^{(A)}, \\ w_t^{(Ac)} = p(y_t \mid x_t^{(Ac)}), \\ w_t^{(Bc)} = p(y_t \mid x_t^{(Bc)}). \end{cases}$$

Equation 4

Here, xt(A) and xt(B) indicate parent samples, xt(Ac) and xt(Bc) indicate child samples, $\xi$ indicates an arbitrary real number that is chosen from a random uniform distribution between 0 and 1, wt(Ac) indicates the weight of the child sample xt(Ac), and wt(Bc) indicates the weight of the child sample xt(Bc). The weights wt(Ac) and wt(Bc) are probabilities that the child samples xt(Ac) and xt(Bc) will match an observed value. Each of the child samples xt(Ac) and xt(Bc) can be represented by a weighted sum of the parent samples xt(A) and xt(B), as indicated by Equation 4.

Figure 6:
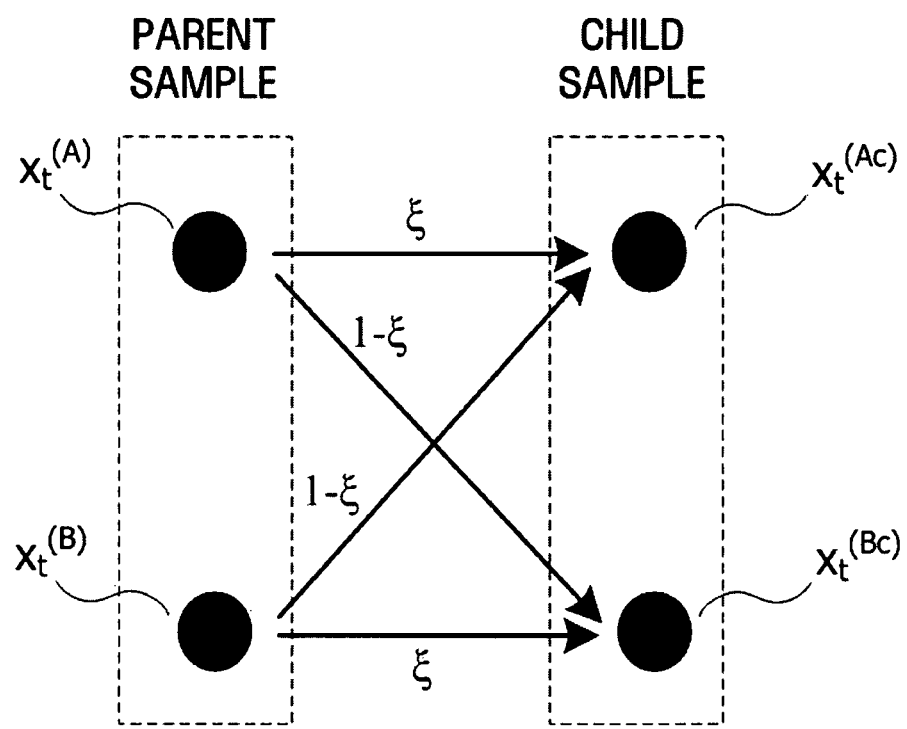
FIG. 6 is a diagram for explaining a crossover algorithm.

In detail, referring to FIG. 6, the crossover applicator 232 may, thus, choose a pair of samples with the highest weight values from among the parent samples xt(A) and xt(B) and the child samples xt(Ac) and xt(Bc), and update the parent samples xt(A) and xt(B) with the chosen samples. This type of crossover can be applied to any arbitrary pair of samples that can be made up of the M evolution samples, for example.

The mutation applicator 233 may further extract one of the M evolution samples to which a crossover algorithm is applied by the crossover applicator 232, e.g., xt(A). Then, if a weight wt(A) of the extracted sample xt(A) exceeds or meets a predefined threshold, the mutation applicator 233 may apply a mutation algorithm to the extracted sample xt(A) in consideration that mutation is likely to increase errors when being applied to samples with low weight values.

Such a mutation algorithm may be represented by the below Equation 5, for example.

$$\begin{cases} x_t^{(Am)} = x_t^{(A)} + \tau \\ w_t^{(Am)} = p(y_t \mid x_t^{(Am)}) \end{cases}$$

Equation 5

Here, $\tau$ indicates random noise and is a three-dimensional (3D) vector that follows a Gaussian distribution N(0, σ2) (where σ indicates standard deviation), xt(A) indicates a parent sample, and xt(Am) indicates a child sample obtained from the parent sample xt(A) through mutation.

Figure 7:
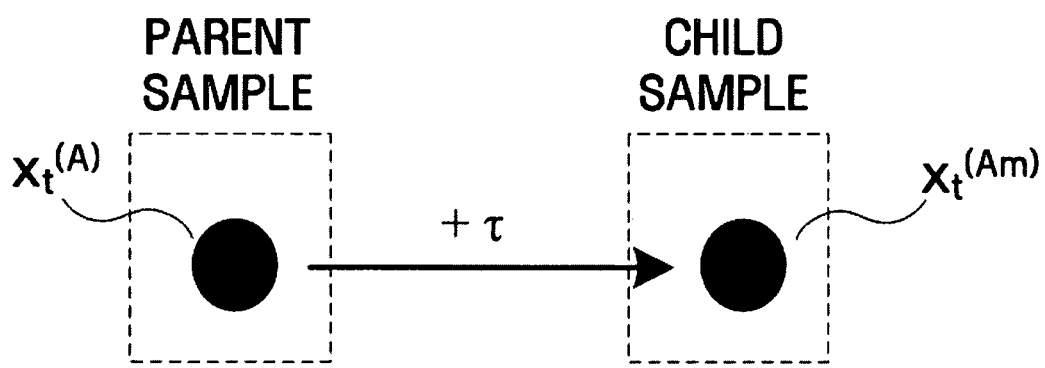
FIG. 7 is a diagram for explaining a mutation algorithm.

In detail, referring to FIG. 7, the mutation applicator 233, for example, may choose whichever of the parent sample xt(A) and the child sample xt(Am) has a higher weight value than the other, e.g., the parent sample xt(A), and update the child sample xt(Am) with the parent sample xt(A).

Whenever the example crossover and/or mutation performed on the M evolution samples are complete, an evolution level may be increased by 1. The aforementioned crossover and mutation operations may further be repeatedly performed on the M evolution samples until the evolution level reaches the evolution level G determined by the initializer 231.

According to one embodiment, a crossover algorithm may be applied first to a number of evolution samples, and then a mutation algorithm applied. However, embodiments of the present invention are not limited thereto. For example, a mutation algorithm may be applied first to a number of evolution samples, and then a crossover algorithm applied. Alternatively, only one of the example crossover and mutation algorithms may be applied to a number of evolution samples.

A weight wt(j) of the j-th particle that may be optimized by the evolution unit 230 may be further normalized using the below Equation 6, for example.

$$w_t^{(j)} = w_t^{(j)} \bigg/ \sum_{k=1}^{N} w_t^{(k)}$$

Equation 6

Here, in this case, the sum of the weights of all the N particles is 1.

As a result of the aforementioned operation, an optimized parameter set St may be obtained according to the below Equation 7, for example.

$$S_t = \{(x_t^{(j)}, w_t^{(j)}) \mid j=1, \ldots, N\}$$

Equation 7

Here, the optimized parameter set St may be provided to the sampler 211, for example. Then, when the tie count increases by 1, the sampler 211 may perform resampling on N particles having the optimized parameter set St. Thereafter, the pose estimator may 212 perform pose estimation on the N particles obtained by the resampling, and the weight calculator 213 may calculate a weight of each of the N particles obtained by the resampling. Still further, the evolution applicator 230 may apply an evolution algorithm to the N particles obtained by the resampling. Accordingly, these operations may be repeatedly performed until the time count ends, e.g., until the example mobile robot 100 arrives at the example end point E represented in FIG. 4.

The pose of whichever of the optimized particles provided by the evolution unit 230 has a highest weight value may, thus, be identified as a current pose of the example mobile robot 100. The pose of the optimized particle with the highest weight value may further be provided to such a robot control module 110. Then, the robot control module 110 may control the mobile robot 100 to move and perform an operation, such as cleaning, based on the pose of the optimized particle with the highest weight value.

Figure 8A:
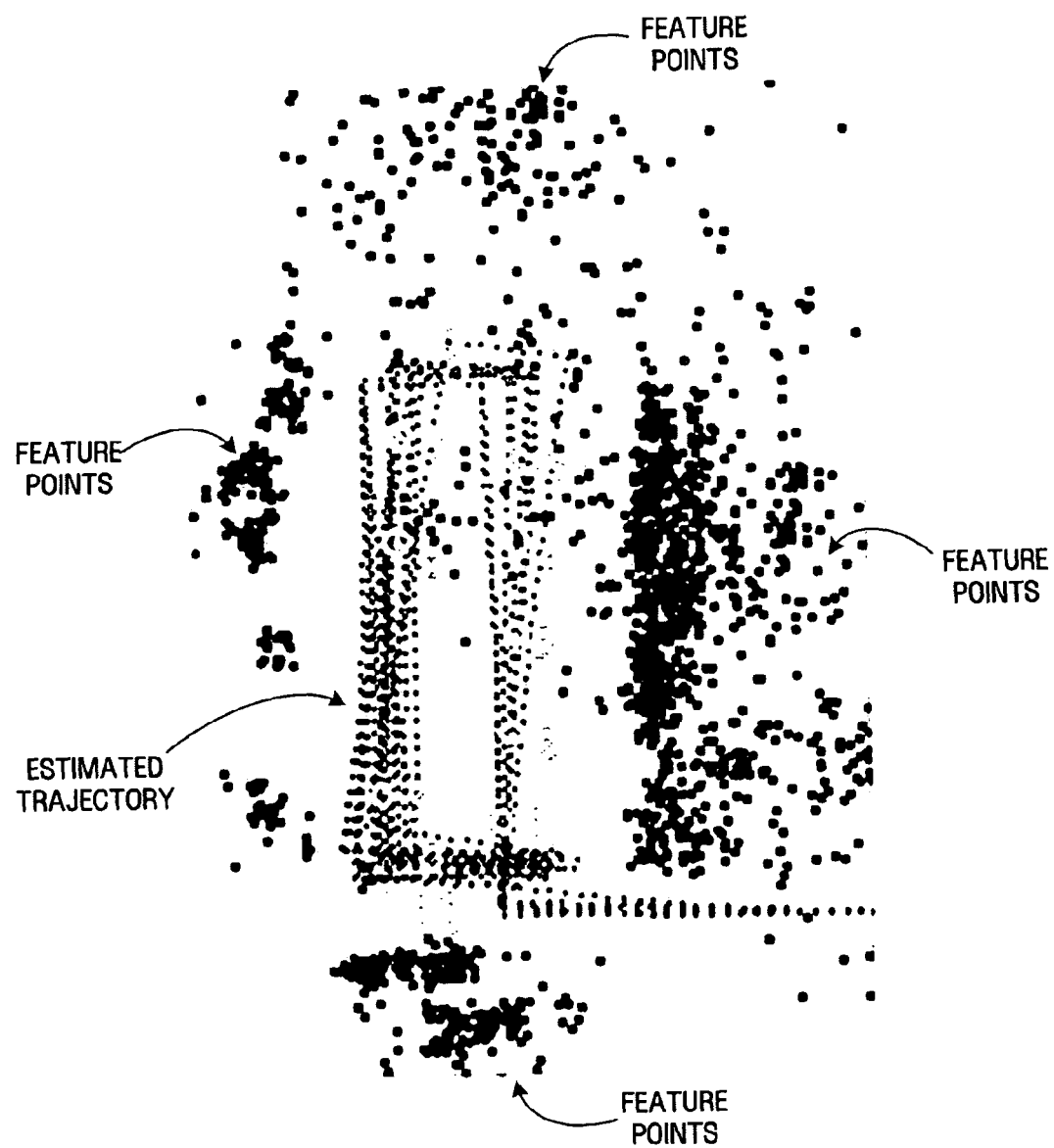
FIG. 8A illustrates localization and mapping results obtained using a conventional particle filter method.
Figure 8B:
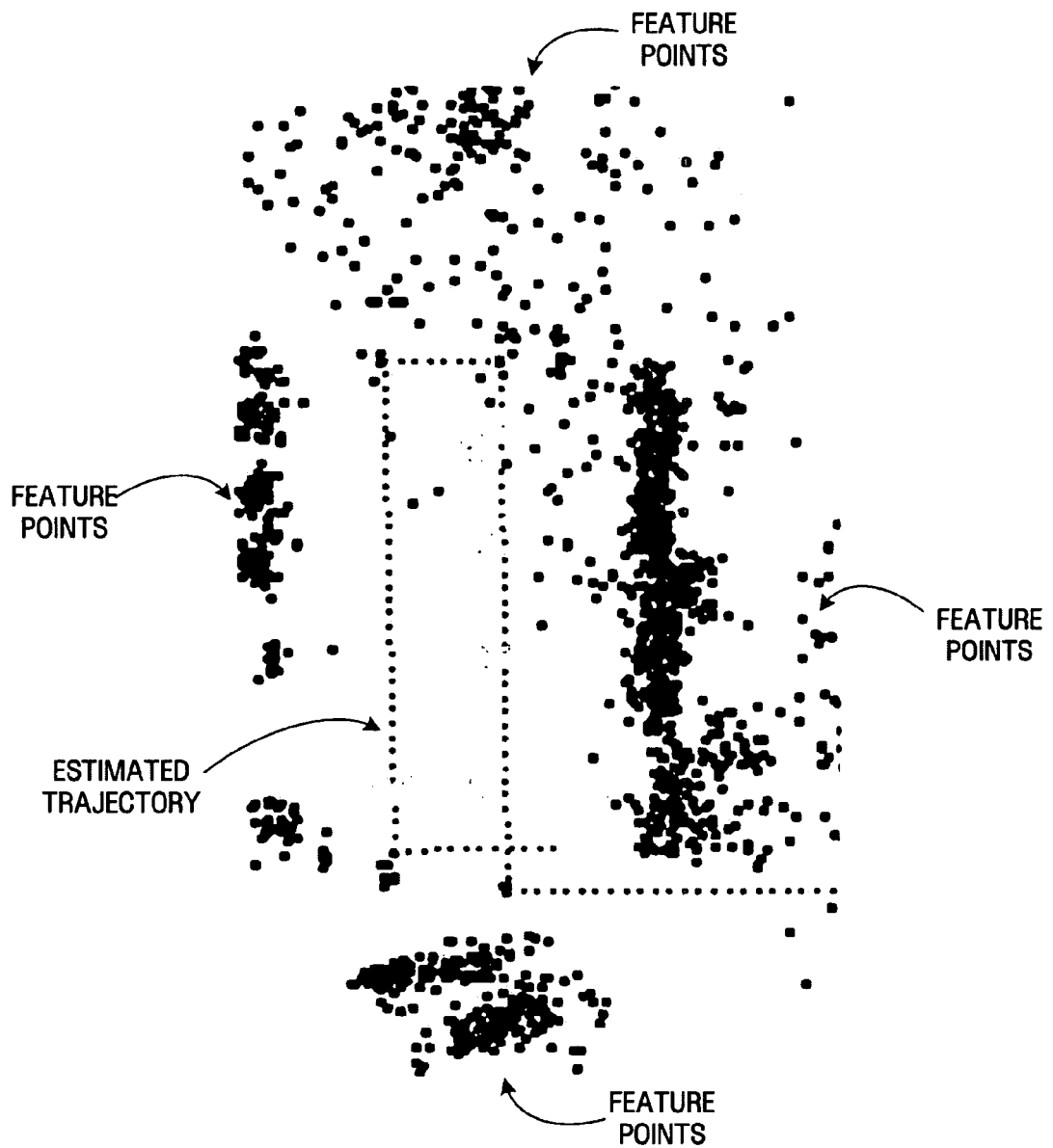
FIG. 8B illustrates localization and mapping results obtained using a particle filter method, according to an embodiment of the present invention.

FIGS. 8A and 8B are diagrams comparing a result from an embodiment of the present invention with results of a conventional system. Specifically, FIG. 8A illustrates localization and mapping results obtained using a conventional particle filter technique, and FIG. 8B illustrates localization and mapping results obtained using a particle filter technique according to an embodiment of the present invention. The number of particles used to produce the localization and mapping results presented in FIG. 8A was 100, whereas the number of particles used to produce the localization and mapping results presented in FIG. 8B was 50 (evolution level: 5). Accordingly, it is possible to more precisely create a map even with fewer particles than conventional systems.

In addition, referring to FIGS. 8A and 8B, the time taken to perform SLAM in the prior art was 474.7 ms, whereas the time taken to perform SLAM according to the embodiment of the present invention was 443.5 ms. In short, according to one or more embodiments of the present invention, it is possible to provide better results, while potentially spending essentially the same time as in conventional systems.

The term 'module', as used herein, means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules.

In addition, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, it is possible to reduce the number of particles used for moving a mobile robot by applying an evolution algorithm to a particle filter technique estimating the pose of the mobile robot. Accordingly, computation speed of SLAM for the mobile robot can be enhanced, and required memory sizes can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A movement system, the system comprising:
    a particle filter unit to determine poses and weights of current particles by applying a detected pose variation to previously identified particles, with the detected pose variation being detected by a sensor to detect a pose variation in a pose of a mobile element;
    an evolution unit to update the determined poses and weights of the current particles by applying an evolution algorithm to the determined poses and weights of the current particles to estimate a current pose of the mobile element;
    a camera to capture an image of an outside of the mobile element; and
    a feature point processing unit to extract a least one feature point from the captured image and to create a map by processing the extracted feature point and the determined poses, with the processing of the extracted feature point including determining whether one of plural currently calculated gray gradient vectors for a current feature point match a previously calculated gray gradient vector for a previously extracted feature point,
    wherein the extracted feature point is scale-invariant and rotation-invariant from the captured image.

2. The system of claim 1, further comprising the sensor to detect the pose variation in the pose of the mobile element.

3. The system of claim 2, wherein the sensor comprises at least one of an encoder and a gyroscope.

4. The system of claim 1, wherein each of the poses of the current particles comprises a pair of coordinates on a two-dimensional (2D) coordinate system and azimuth information.

5. The system of claim 1, wherein the system and the mobile element make up a mobile robot, and the system further comprises a traveling module having a moving mechanism to move the mobile robot based upon the estimated current pose of the mobile robot.

6. The system of claim 1, wherein the particle filter unit comprises:
    a pose estimator to perform the determining of the poses of the current particles by the applying of the detected pose variation to the previously identified particles; and
    a weight calculator to compare an observed pose obtained using the extracted feature point with the determined poses of the current particles and apply a determined high weight value to a current particle that produces a pose determined to be similar to the observed pose.

7. The system of claim 6, wherein the particle filter unit further comprises a sampler to perform sampling on a plurality of available particles according to an initial pose of the mobile element and perform resampling on the sampled plurality of available particles according to corresponding updated weights.

8. The system of claim 1, wherein the evolution unit comprises a crossover applicator to select two or more parent samples from among a plurality of evolution samples, calculate a weighted sum of the selected parent samples, and select one or more samples from among the selected parent samples and one or more child samples generated based on the weighted sum of the selected parent samples, with the evolution samples being obtained from one of a plurality of available particles through random sampling.

9. The system of claim 8, wherein the evolution unit selects one or more samples having determined high weight values from among the selected parent samples and the child samples.

10. The system of claim 1, wherein the evolution unit comprises a mutation applicator to select a parent sample from among a plurality of evolution samples, generate a child sample by applying random noise to the selected parent sample, and select one of the selected parent sample and the child sample that has a higher weight value, with the evolution samples being obtained from one of a plurality of available particles through random sampling.

11. The system of claim 10, wherein the random noise follows a Gaussian distribution.

12. The system of claim 10, wherein the selected parent sample is an evolution sample whose weight value exceeds a predefined threshold.

13. The system of claim 1, wherein the detected pose variation is a pose estimation, as a probability distribution, of the mobile element based on measured movement, by the sensor, of the mobile robot.

14. The system of claim 13, wherein the probability distribution is based at least on a conditional probability $p(x_t|x_{t-1}, u_{t-1})$, where $x_{t-1}$ indicates a pose at a time $(t-1)$, $u_{t-1}$ indicates data measured by the sensor, and $x_t$ indicates a pose at a current time t.

15. The system of claim 14, wherein the determined pose of each current particle is represented by a respective $x_t$ pose and the determined weight of each current particle is represented by a respective $w_t$ weight, with the respective $w_t$ indicating a probability of an actual pose of the mobile element coinciding with the respective $x_t$ pose.

16. The system of claim 15, further comprising a feature point matcher to match the extracted feature points with stored feature points,
wherein the determining of the poses and weights by the particle filter includes updating the determined weights after feature point matching by the feature point matcher.

17. A movement system, the system comprising:
a particle filter unit to determine poses and weights of current particles by applying a detected pose variation to previously identified particles, with the detected pose variation being detected by a sensor to detect a pose variation in a pose of a mobile element;
an evolution unit to update the determined poses and weights of the current particles by applying an evolution algorithm to the determined poses and weights of the current particles to estimate a current pose of the mobile element;
a camera to capture an image of an outside of the mobile element; and
a feature point processing unit to extract a least one feature point from the captured image and to create a map by processing the extracted feature point and the determined poses,
wherein the extracted feature point is scale-invariant and rotation-invariant from the captured image,
wherein the evolution unit comprises a mutation applicator to select a parent sample from among a plurality of evolution samples, generate a child sample by applying random noise to the selected parent sample, and select one of the selected parent sample and the child sample that has a higher weight value, with the evolution samples being obtained from one of a plurality of available particles through random sampling, and
wherein the selected parent sample is an evolution sample whose weight value exceeds a predefined threshold.

18. A mobile movement controlling method, the method comprising:
determining poses and weights of current particles by applying a detected pose variation to previously identified particles, with the detected pose variation being a pose variation in a pose of a mobile element;
updating and outputting the determined poses and weights of the current particles by applying an evolution algorithm to the determined poses and weights of the current particles to estimate a current pose of the mobile element;
capturing an outside image of the mobile element; and
extracting at least one feature point from the captured image for obtaining an observed pose and creating a map by processing the extracted feature point and the determined poses, with the processing of the extracted feature point including determining whether one of plural currently calculated gray gradient vectors for a current feature point match a previously calculated gray gradient vector for a previously extracted feature point,
wherein the extracted feature point is scale-invariant and rotation-invariant from the captured image.

19. The method of claim 18, further comprising detecting the pose variation in the pose of the mobile element.

20. The method of claim 19, wherein the detecting of the pose variation comprises using at least one of an encoder and a gyroscope.

21. The method of claim 18, wherein each of the poses of the current particles comprises a pair of coordinates on a two-dimensional (2D) coordinate system and azimuth information.

22. The method of claim 18, wherein the determining of the poses and weights further comprises:
performing the determining of the poses of the current particles by applying the detected pose variation to the previously identified particles; and
comparing an observed pose obtained using the extracted feature point with the determined poses of the current particles and applying a determined high weight value to a current particle that produces a pose determined to be similar to the observed pose.

23. The method of claim 22, wherein the determining further comprises:
performing sampling on a plurality of available particles according to an initial pose of the mobile element; and
performing resampling on the sampled plurality of available particles according to corresponding updated weights.

24. The method of claim 18, wherein the updating comprises:
selecting two or more parent samples from among a plurality of evolution samples that are obtained from one of a plurality of available particles through random sampling;
calculating a weighted sum of the selected parent samples; and
selecting one or more samples from among the selected parent samples and one or more child samples that are generated based on the weighted sum of the selected parent samples.

25. The method of claim 24, wherein the selecting of the one or more samples from among the selected parent samples and the one or more child samples comprises selecting one or more samples having determined high weight values from among the selected parent samples and the child samples.

26. The method of claim 18, wherein the updating comprises:
    selecting a parent sample from among a plurality of evolution samples that are obtained from one of a plurality of available particles through random sampling;
    generating a child sample by applying random noise to the selected parent sample; and
    selecting one of the selected parent sample and the child sample that has a higher weight value.

27. The method of claim 26, wherein the random noise follows a Gaussian distribution.

28. The method of claim 26, wherein the selected parent sample is an evolution sample whose weight value exceeds a predefined threshold.

29. The method of claim 18, wherein the detected pose variation is a pose estimation, as a probability distribution, of the mobile element based on measured movement, by a sensor, of the mobile robot.

30. The method of claim 29, wherein the probability distribution is based at least on a conditional probability $p(x_t|x_{t-1}, u_{t-1})$, where $x_{t-1}$ indicates a pose at a time $(t-1)$, $u_{t-1}$ indicates data measured by sensor, and $x_t$ indicates a pose at a current time t.

31. The method of claim 30, wherein the determined pose of each current particle is represented by a respective $x_t$ pose and the determined weight of each current particle is represented by a respective $w_t$ weight, with the respective $w_t$ indicating a probability of an actual pose of the mobile element coinciding with the respective $x_t$ pose.

32. The method of claim 31, further comprising matching the extracted feature points with stored feature points, wherein the determining of the poses and weights further comprises updating the determined weights after the matching.

33. A mobile movement controlling method, the method comprising:
    determining poses and weights of current particles by applying a detected pose variation to previously identified particles, with the detected pose variation being a pose variation in a pose of a mobile element;
    updating and outputting the determined poses and weights of the current particles by applying an evolution algorithm to the determined poses and weights of the current particles to estimate a current pose of the mobile element;
    capturing an outside image of the mobile element; and
    extracting at least one feature point from the captured image for obtaining an observed pose and creating a map by processing the extracted feature point and the determined poses,
    wherein the extracted feature point is scale-invariant and rotation-invariant from the captured image,
    wherein the updating comprises:
    selecting a parent sample from among a plurality of evolution samples that are obtained from one of a plurality of available particles through random sampling;
    generating a child sample by applying random noise to the selected parent sample; and
    selecting one of the selected parent sample and the child sample that has a higher weight value, and
    wherein the selected parent sample is an evolution sample whose weight value exceeds a predefined threshold.

34. At least one non-transitory medium comprising computer readable code to control at least one processing element to implement the method of claim 18.

35. A movement system, the system comprising:
    a particle filter unit to determine poses and weights of current particles by applying a detected pose variation to previously identified particles, with the detected pose variation being detected by a sensor to detect a pose variation in a pose of a mobile element;
    an evolution unit to update the determined poses and weights of the current particles by applying an evolution algorithm to the determined poses and weights of the current particles to estimate a current pose of the mobile element;
    a camera to capture an image of an outside of the mobile element; and
    a feature point processing unit to extract a least one feature point from the captured image and to create a map by processing the extracted feature point and the determined poses,
    wherein the extracted feature point is scale-invariant and rotation-invariant from the captured image,
    wherein the detected pose variation is a pose estimation, as a probability distribution, of the mobile element based on measured movement, by the sensor, of the mobile robot, and
    wherein the probability distribution is based at least on a conditional probability $p(x_t|x_{t-1}, u_{t-1})$, where $x_{t-1}$ indicates a pose at a time $(t-1)$, $u_{t-1}$ indicates data measured by the sensor, and $x_t$ indicates a pose at a current time t.

36. The system of claim 35, wherein the determined pose of each current particle is represented by a respective $x_t$ pose and the determined weight of each current particle is represented by a respective $w_t$ weight, with the respective $w_t$ indicating a probability of an actual pose of the mobile element coinciding with the respective $x_t$ pose.

37. The system of claim 36, further comprising a feature point matcher to match the extracted feature points with stored feature points,
    wherein the determining of the poses and weights by the particle filter includes updating the determined weights after feature point matching by the feature point matcher.

38. A mobile movement controlling method, the method comprising:
    determining poses and weights of current particles by applying a detected pose variation to previously identified particles, with the detected pose variation being a pose variation in a pose of a mobile element;
    updating and outputting the determined poses and weights of the current particles by applying an evolution algorithm to the determined poses and weights of the current particles to estimate a current pose of the mobile element;
    capturing an outside image of the mobile element; and
    extracting at least one feature point from the captured image for obtaining an observed pose and creating a map by processing the extracted feature point and the determined poses,
    wherein the extracted feature point is scale-invariant and rotation-invariant from the captured image,
    wherein the detected pose variation is a pose estimation, as a probability distribution, of the mobile element based on measured movement, by a sensor, of the mobile robot, and
    wherein the probability distribution is based at least on a conditional probability $p(x_t|x_{t-1}, u_{t-1})$, where $x_{t-1}$ indicates a pose at a time (t−1), ut−1 indicates data measured by sensor, and xt indicates a pose at a current time t.

40. The method of claim 38, wherein the determined pose of each current particle is represented by a respective xt pose and the determined weight of each current particle is represented by a respective wt weight, with the respective wt indicating a probability of an actual pose of the mobile element coinciding with the respective xt pose.

40. The method of claim 39, further comprising matching the extracted feature points with stored feature points,
wherein the determining of the poses and weights further comprises updating the determined weights after the matching.

* * * * *